No. 619,636. Patented Feb. 14, 1899.
O. A. P. TRÜSTEDT.
APPARATUS FOR SEPARATING MAGNETIC MATERIALS.
(Application filed July 31, 1895.)

(No Model.) 2 Sheets—Sheet 2.

Witnesses:

Inventor
Otto Alexander Paul Trüstedt
by Olof Dahl
his att'y

UNITED STATES PATENT OFFICE.

OTTO ALEXANDER PAUL TRÜSTEDT, OF STOCKHOLM, SWEDEN.

APPARATUS FOR SEPARATING MAGNETIC MATERIALS.

SPECIFICATION forming part of Letters Patent No. 619,636, dated February 14, 1899.

Application filed July 31, 1895. Serial No. 557,681. (No model.)

*To all whom it may concern:*

Be it known that I, OTTO ALEXANDER PAUL TRÜSTEDT, a subject of the Emperor of Germany, and a resident of 34 Kungsgatan, in the city of Stockholm, in the Kingdom of Sweden, have invented a new and useful Improvement in Apparatus for Separating Magnetic Materials, (for which a patent has been granted me in Sweden, No. 7,032, dated May 7, 1895,) of which the following is a specification, reference being had to the drawings accompanying and forming a part of the same.

The object of this invention is to provide a magnetic separator which will effect a good separation of the magnetic particles by causing them to tumble over and which will, all the same, be cheap to build and cheap to maintain, owing to the absence of any moving machinery and of any kind of commutator on the same or the generator of the electric current needed for the same.

The invention consists in letting the pulverized material fall on or past one side of a non-magnetic material on the other side of which is placed a series of electromagnetic poles the windings of which are connected to the different coils of a generator for multiphase alternating currents in such a manner that the magnetic field of force wanders in a certain direction in the same way as in the well-known multiphase electric motors. The electromagnet system is stationary, as well as the cover; but the magnetic particles in trying to follow the wandering magnetic field will jump or tumble over in the same way as they would do if all the magnets were excited by currents of the same phase, but the system of electromagnets was moving.

Figure 1:
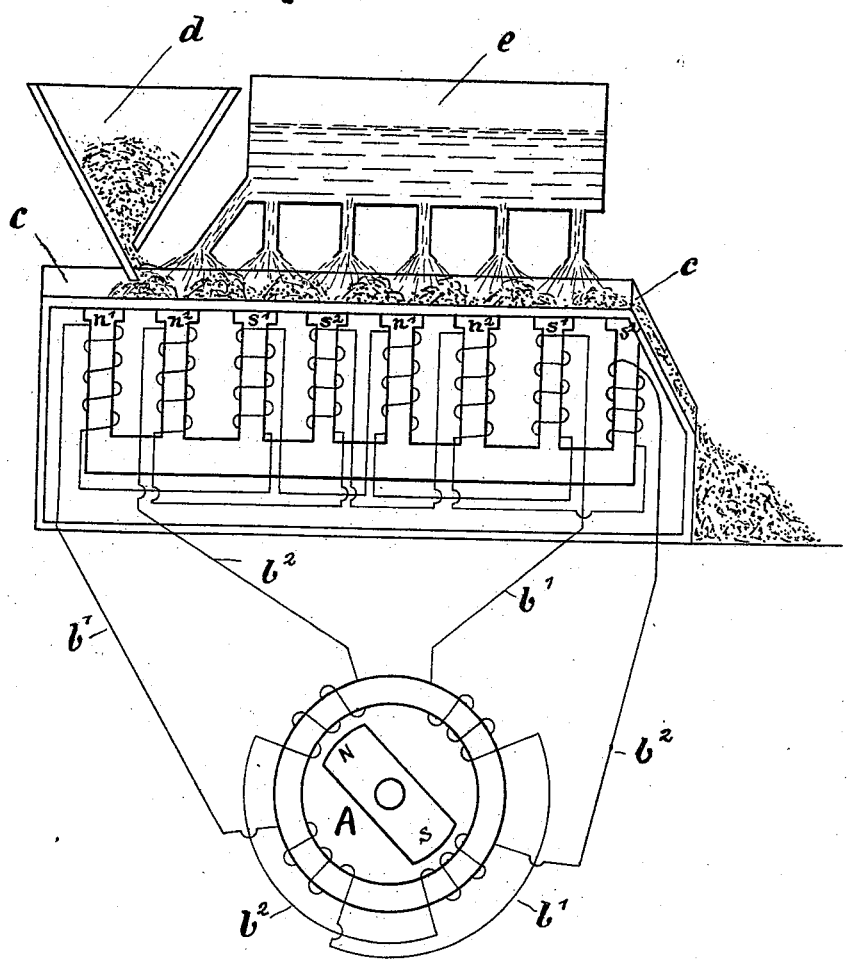
Figure 2:
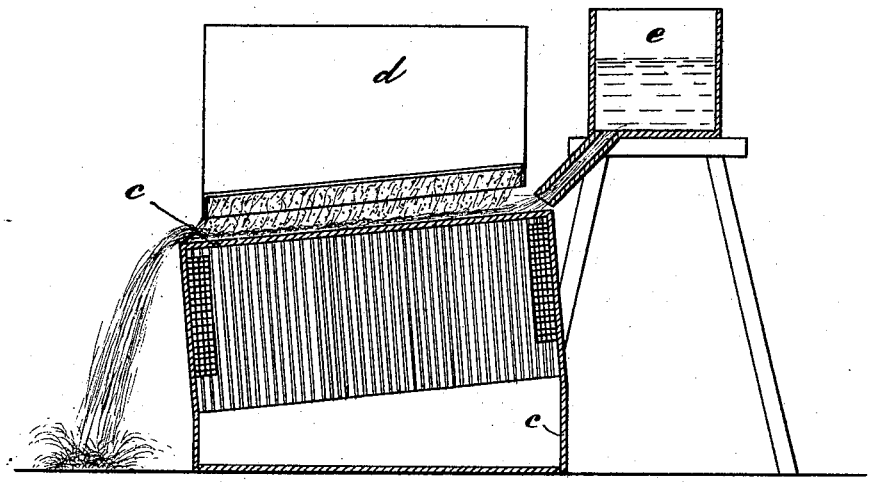

In the drawings, Figure 1 is a vertical sectional view of a separator, showing the connections with the electric generator; and Fig. 2 is a sectional view in a plane at right angles to the view in Fig. 1.

A represents a generator for alternating currents, the armature of which is provided with two windings $b'$ $b^2$, placed ninety degrees apart in the well-known manner, so that alternating currents whose phase is about ninety degrees different are generated. One winding, $b'$, is connected to the first, fifth, &c., poles $n'$ in the row of electromagnet-poles in the separator and connected in the reverse direction to the third, seventh, &c., poles $s'$ in the same row, so that the poles $n'$ receive opposite polarity to the poles $s'$. The other winding, $b^2$, of the two-phase generator A is in the same way connected, so that the current in the same energizes the even-numbered magnet-poles in the said row, so that every alternate one of the poles $n^2$ receives opposite polarity to the others, $S^2$. The result of this connection will be that the magnetic field of force will wander in a certain direction from pole to pole when currents are generated in the generator. On the faces of the poles is placed a non-magnetic cover $c$, preferably laid directly onto the faces. The said cover may inclose all the magnets, as shown in the drawings, the wires leading to the different magnets entering through said cover in a suitable manner.

The pulverized mixture of magnetic iron ore or other similar particles to be separated is fed out on the one end of the cover from a hopper $d$, so that the particles fall in the magnetic field of force. The generator A is rotated in such a direction that the magnetic field wanders from the left to the right. The magnetizable particles being acted upon by the magnetic field will then try to follow the lines of force; but as the north pole, for instance, wanders from the pole $n'$ to $n^2$ from thence to $s$, &c., the magnetic particles will jump over from the pole $n'$ to the pole $n^2$, and so on, following the magnetic field of force till at the other end of the cover they fall down over the edge. From a vat $e$ water may be forced over the wandering particles in a direction preferably crossing that in which the field of force and the magnetic particles move. The water will then wash away the unmagnetic particles, so that they fall on another side. Instead of water a current of air may be used.

In order to facilitate the magnetic particles leaving the last pole, the last edge of it is cut off and the cover made sloping.

The pulverized mass may be mixed with water and in a stream led over or past the magnetic field, which moves in a direction preferably crossing that in which the stream moves. The magnetized particles will cling to the field and by its moving be carried outside the stream, while the non-magnetic particles will follow the stream.

It should be unnecessary to mention that to avoid the heating of the magnets their cores should be well laminated and of soft iron, as is used in alternating-current electromagnets generally.

The dimensions of the magnet-poles, their number, and the frequency of the alternating current will depend upon each other and the material that is to be separated.

Instead of two-phase currents, as have been described, three or more phase currents may be used in a similar manner.

It is obvious that the invention may be carried out and utilized in many different manners well understood by any person skilled in the art to which it appertains.

What I claim, and desire to secure by Letters Patent, is—

1. The combination with the electromagnet of a magnetic separator, of a generator for multiphase alternating currents, from which each current is led around different poles in the said electromagnet so as to cause a wandering field of force to be created in the said magnet, which field of force carries away the magnetic particles in a direction different to that in which the non-magnetic particles move, substantially as described.

2. In a magnetic separator, the combination with a series of electromagnets, of a stationary non-magnetic covering on the magnet-poles and a source of multiphase alternating currents of which the windings of each phase are connected to different magnets in the said series, substantially as and for the purpose set forth.

3. In a magnetic separator, the combination with a series of electromagnets, of a source of multiphase alternating currents of which the windings of each phase are connected to different magnets in the said series, substantially as and for the purpose set forth.

In testimony that I claim the foregoing as my invention I have signed my name, in presence of two witnesses, this 22d day of May, 1895.

OTTO ALEXANDER PAUL TRÜSTEDT.

Witnesses:
H. SWANBERG,
A. S. DAHL.